Figure 1:
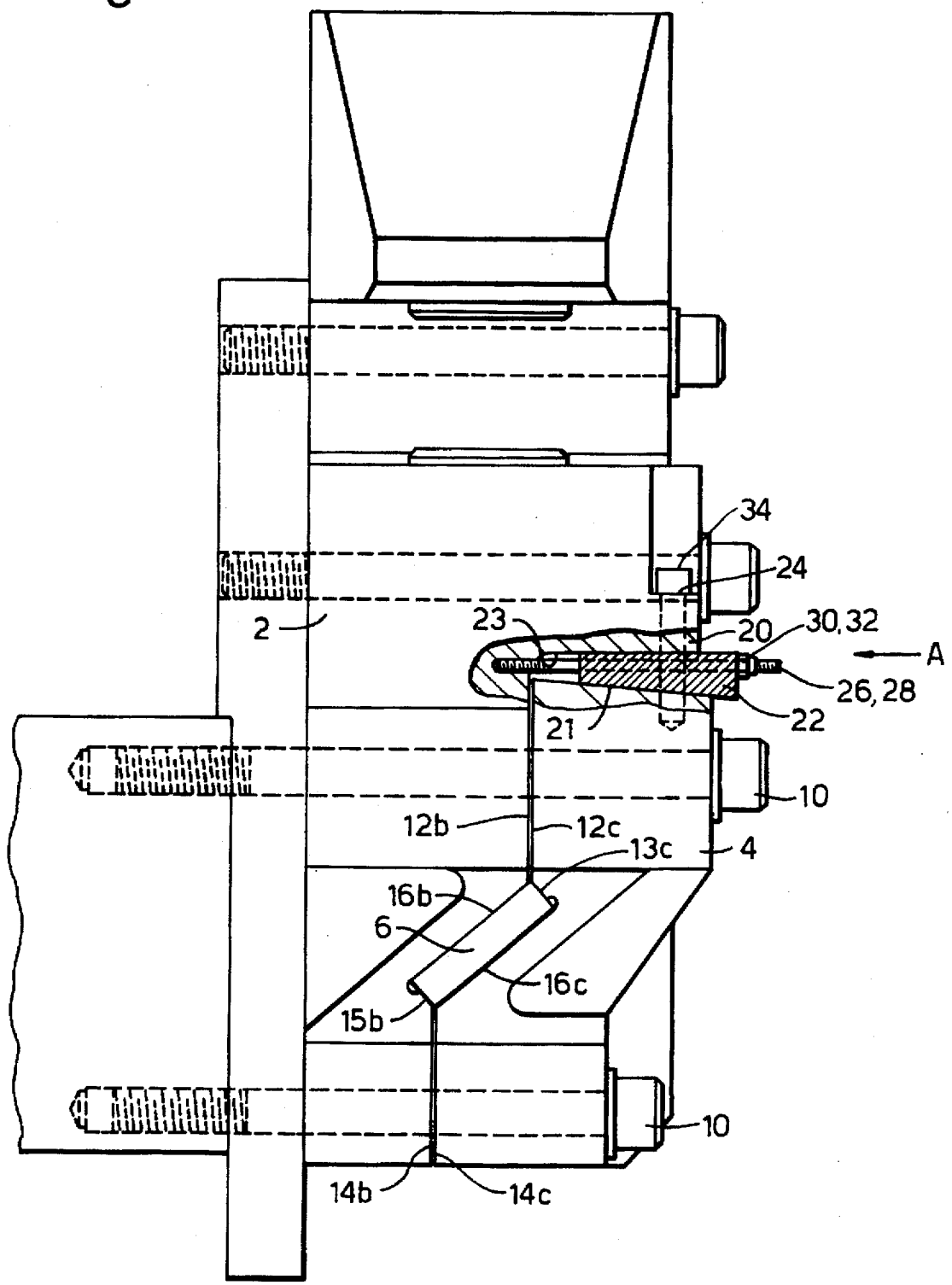

United States Patent [19]

Harris

[11] Patent Number: 5,678,750
[45] Date of Patent: Oct. 21, 1997

[54] FRICTION WELDING TOOLING

[75] Inventor: Frederick J. Harris, Birmingham, Great Britain

[73] Assignee: Rolls-Royce plc, London, Great Britain

[21] Appl. No.: 572,692

[22] Filed: Dec. 14, 1995

[30] Foreign Application Priority Data

Dec. 23, 1994 [GB] United Kingdom ............... 9426177

[51] Int. Cl.$^6$ ........................... B23K 20/12; B23K 37/04
[52] U.S. Cl. ..................... 228/2.1; 228/44.3; 269/234; 269/268
[58] Field of Search ........................ 228/2.3, 114.5, 228/2.1, 44.3, 112.1; 269/234, 268

[56] References Cited

U.S. PATENT DOCUMENTS

| 5,188,275 | 2/1993 | Daines | 228/2.1 |
|---|---|---|---|
| 5,486,262 | 1/1996 | Searle | 228/2.1 |
| 5,492,581 | 2/1996 | Searle | 228/2.1 |

FOREIGN PATENT DOCUMENTS

| 404531 | 12/1990 | European Pat. Off. | 228/2.1 |
|---|---|---|---|
| 458630 | 11/1991 | European Pat. Off. | 228/2.1 |

Primary Examiner—P. Austin Bradley
Assistant Examiner—Jeffrey T. Knapp
Attorney, Agent, or Firm—Oliff & Berridge

[57] ABSTRACT

Friction welding tooling includes a cassette (2,4) for holding a component (6) which is to be welded with great accuracy to a clamped workpiece. The cassette is carried on the distal end of an oscillator arm (8) and urged against the workpiece surface so the cassette has to transmit the frictional heating and weld forming forces to the component. The component (6) must be clamped accurately and securely by the cassette for accurate welding. The cassette comprises a base portion (2) and a floating cap (4). The base portion carried by the oscillator arm (8) has locating features (15,16) to position the component (6) accurately. The floating cap (4) has similar locating features (13,16) but locates entirely on the component (6). The cap (4) is then securely clamped to the base portion (2) with a force transmitting wedge (22) inserted by opposing faces (24,25) in a load path.

9 Claims, 2 Drawing Sheets

FRICTION WELDING TOOLING

The invention concerns friction welding tooling. In particular it relates to a part of the tooling which clamps a component which is to be welded to a separately clamped workplace.

In the manufacture of BLISK's, integrally bladed discs, and BLUMS's, integrally bladed drums, for gas turbine engines accuracy of location of the blade or blade blank is of prime importance. The blades may be friction welded to the disc as a finished item or as a part-finished item, ie as a blade blank to be subsequently finished by mechanical or chemical machining processes. In either case when the blade (which term is hereinafter used to include a blank) is clamped into a holding cassette it is important that it is accurately located in the cassette prior to commencement of the welding operation.

The blade cassette or tooling of immediate interest consists of a cassette base member and a demountable cap. The cassette is carried at a distal end of an oscillator arm which produces the friction generating movement and is connected to a weld-pressure generating ram. In order to load a fresh blade into the cassette prior to the commencement of a welding operation the cap is removed, the blade inserted and the cap replaced. Any misalignment or movement of the blade when the cap is refitted therefore results in an error in the orientation of the blade when it is welded. The invention seeks to overcome this drawback by providing a floating cap.

According to the present invention there is provided friction welding tooling comprising clamp means adapted to accurately clamp a component which is to be welded to a workpiece, the clamp means including a base member adapted to accurately locate the component and a demountable cap adapted to accurately locate on the component and which may be attached to the base member in order to apply a clamp force to the component, the base member and the cap being formed with reference faces which are spaced apart to form a gap in a load path between the base and the cap, and a spacer member adapted to be forcibly inserted into the gap to render the load path rigid.

Preferably the base member and the cap are formed with V-notch features adapted to engage edges of the component for accurate location. Preferably also the reference faces are non-parallel and form a tapering gap and the spacer member for insertion in the gap is wedge shaped.

Figure 2:
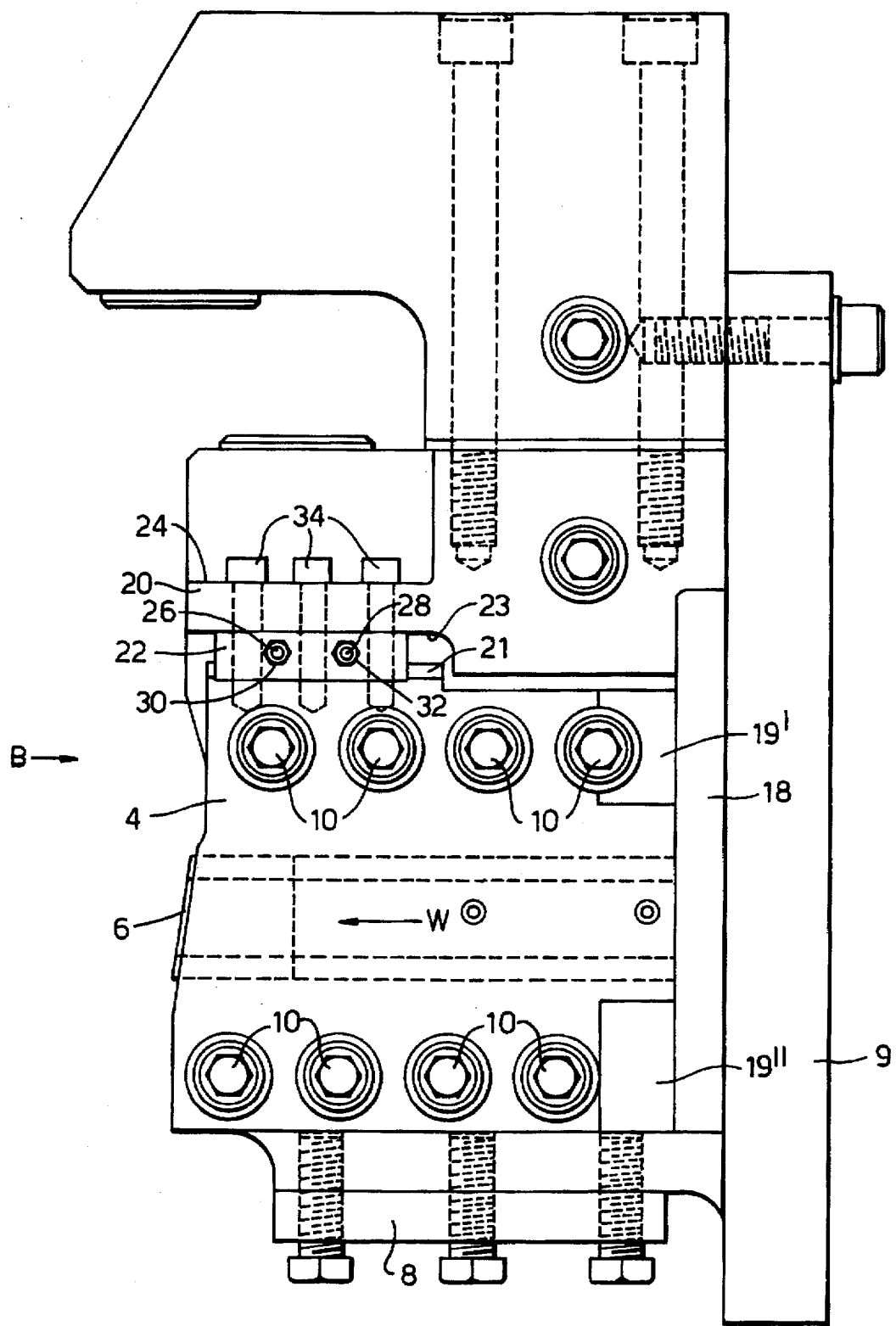

The invention and how it may be carried into practice will now be described by way of example only with reference to the accompanying drawings, in which:

FIG. 1 shows an "end-on" view of the cassette tooling including a demountable cap, viewed in the direction of arrow B in FIG. 2, and FIG. 2 shows a "side" view of the cassette tooling of FIG. 1, viewed in the direction of arrow A in that drawing.

Referring now to the drawings the friction welding cassette illustrated is adapted for use as part of the tooling and friction welding apparatus described and illustrated in our co-pending patent application filed herewith (Ser. No. 08/570,010, filed Dec. 14, 1995).

The cassette of the accompanying drawing comprises a cassette base member 2 having a demountable cap 4 which is mounted on the base member 2 to apply a clamp load to a component 6. In this example the component 6 comprises a blade blank, but it might be a finished or part-finished blade, which is to be friction welded to the periphery of a disc (not shown) for a rotary BLISK stage of a gas turbine engine axial flow compressor. A finished or part-finished blade would include a shoulder or platform to provide a substantive feature for clamping purposes. In order to achieve this the cap 4 is arranged to "float" with respect to the cassette base 2 so that the entire clamp force is applied to the component through the cap. The invention has for its principal objective the provision of such a floating cap and means for carrying the loads which arise during various phases of the whole welding operation.

As is described in greater detail in the above mentioned co-pending application the cassette base member 2 is mounted at the distal end of an oscillator arm 8, and a weld-pressure generating force W is applied in the direction indicated by an arrow in FIG. 2 by a ram 9.

The component 6 is clamped between confronting faces of the cassette base 2 and the cap 4. The confronting faces consist of complementary arrangements of surfaces which in combination provide the required accurate location of the component and the cap itself. The face of the base member 2 comprises two parallel plane surfaces 12b and 14b which are spaced apart by two unequal angled surfaces 15b and 16b. To match the cross-section of the component with which this piece of tooling is designed to operate the included angle between the faces 15b,16b is a right angle. This right angle extends across the width of the base member thereby constituting a V-notch in which an edge of the component is located.

The confronting face of the cap is formed similarly to engage the opposite side of the component. This face also comprises two parallel plane surfaces 12c and 14c spaced apart by two unequal angled surfaces 13c and 16c. Again the included angle between the faces 13c,16c is formed as a right angle to match the component and extends across at least part of the width of the cap thus constituting a V-notch which in this instance is used to locate the cap on the component. This arrangement is best seen in FIG. 1.

The dimensions of these faces, in particular the notch faces, of the base and cap are selected so that when the component and cap are in place on the cassette base a narrow gap remains between the parallel faces 12b,12c and 14b,14c. Thus, when the cap 4 is fitted to the cassette base member 2 the whole of the clamping force is applied to the component, or blade blank in the example, which is thereby firmly clamped. If the component is not of uniform rectangular section, ie as in a part-finished or finished blade it is preferred to provide the component with a locating shoulder which is engaged with the notch faces. Thus all forces are exerted through the notch faces and the shoulder portion of the component. In the case of a part finished airfoil blade for a gas turbine engine no forces are exerted through the finished airfoil portion.

The demountable cap 4 is clamped to the base member 2 by means of eight bolts, each of which carries reference 10. Eight clearance holes 11 are drilled through the flanks of the cap 4, see FIG. 1 to receive the bolts 10. Preferably bolts 10 include shoulders or thrust washers to bear against the exposed cap face. The clearance holes ensure that the bolts 10 exert no lateral forces on the cap. The cap 4 is located by engagement with the component before the clamp force is applied by tightening the bolts 10 to their holding force. The preferred method of fitting the cap is first to butt it against the backing plate 18, for which purpose a heel is provided at the adjacent edge of the cap comprising two slightly raised regions 19, 19' against which the cap can be pivoted into position on the component or component shoulder.

For reasons explained in the co-pending application vertical forces exist in the cassette during welding and frictional heating phases which also pass through the cap. (In the frame of reference of the drawings a vertical direction extends from the top of the page to the bottom, or vice versa.) In order to avoid movement of the cap thereby disturbing the positive location of the component 6 it is therefore necessary to make some provision in the mounting of cap 4 to carry these forces. Since the cap is floating it follows that in the vertical direction it does not abut any portion of the cassette. In order to provide the required load path the cassette base 2 is formed with a step or shoulder 20 opposite an upper edge 21 of the cap. Direct contact between the shoulder 20 and the edge 21 is avoided by arranging for a gap when the cap is in position. A spacer member or floating wedge 22 is then inserted into the gap and clamped firmly in position thereby providing the load path.

The step 20 has a lower face 23 which forms one side of the gap and has a second, upper face 24 which, with respect to the reference directions, is formed horizontally. Three, in this example, clearance holes are drilled in a perpendicular direction downwardly from face 24 in line with clearance slots in wedge 22 and tapped holes in the cap 4. When the wedge 22 has been inserted into the gap bolts 34 are inserted through these holes and tightened to hold the wedge in place.

Preferably the reference faces 23,25 on the base member and cap respectively are formed non-parallel to ensure that the spacer member 22 can be inserted after the cap has been clamped into the component 6. In the illustrated embodiment the face 24 on the base forms a right angle with plane surface 12b. The surface 25 on the cap, however, slopes downwards; that is the internal angle between that face and face 12c is less than a right angle. Thus, when the cap 4 is clamped in position the faces 24,25 form an inwardly tapering gap. The wedge 22 is formed with correspondingly tapering faces to fit into this gap. A pair of studs 26,28 project outwardly through the gap from two holes drilled and tapped in the face 12b to receive the studs. The wedge 22 is drilled through at the same spacing with clearance holes for the studs. The outer ends of the studs are also tapped to take self-locking nuts 30,32 to apply end load for inserting the wedge.

In use, the sequence of operations to fit the cap 4 to the cassette body 2, having placed the blade in position is: first position cap against the backing plate 18, second insert and tighten bolts 10, and third fit the wedge 20 and locking nuts 30,32. The wedge is first fitted, after the cap, by sliding it onto the studs 26,28 and then forcing it into the gap by tightening the self-locking nuts 30,32. Finally the wedge is held securely by the holding bolts 34.

What is claimed is:

1. Friction welding tooling comprising
   clamp means for accurately clamping a component which is to be welded to a workpiece,
   the clamp means including a base member adapted to accurately locate the component and
   a demountable cap adapted to accurately locate the component on the base member and adapted to be attached to the base member in order to apply a clamp force to the component, and
   the base member and the cap being formed with reference faces which are spaced apart to form a gap in a load path between the base and the cap, and
   a spacer member adapted to be forcibly inserted into the gap to render the load path rigid.

2. Friction welding tooling as claimed in claim 1 wherein the base member and the cap are formed with V-notch features adapted to engage edges of the component for accurate location.

3. Friction welding tooling as claimed in claim 1 wherein the reference faces are non-parallel to form a tapering gap and the spacer member is wedge shaped.

4. Friction welding tooling as claimed in claim 3 wherein the width of the gap formed by the reference faces progressively decreases with depth.

5. Friction welding tooling as claimed in claim 1 wherein means is provided for inserting the spacer member in the tapering gap and applying a pre-load force.

6. Friction welding tooling as claimed in claim 5 wherein said means comprises at least one stud mounted in the base member extending through the gap to engage and locate the spacer member in said gap.

7. Friction welding tooling as claimed in claim 6 wherein further means is provided to apply a clamping load between the base member, the cap and the wedge across the wedge gap.

8. Friction welding tooling as claimed in claim 7 wherein said further means comprises a plurality of bolts passing transversely through the wedge.

9. Friction welding tooling as claimed in claim 1 wherein the demountable cap is located on the component.

* * * * *